UNITED STATES PATENT OFFICE.

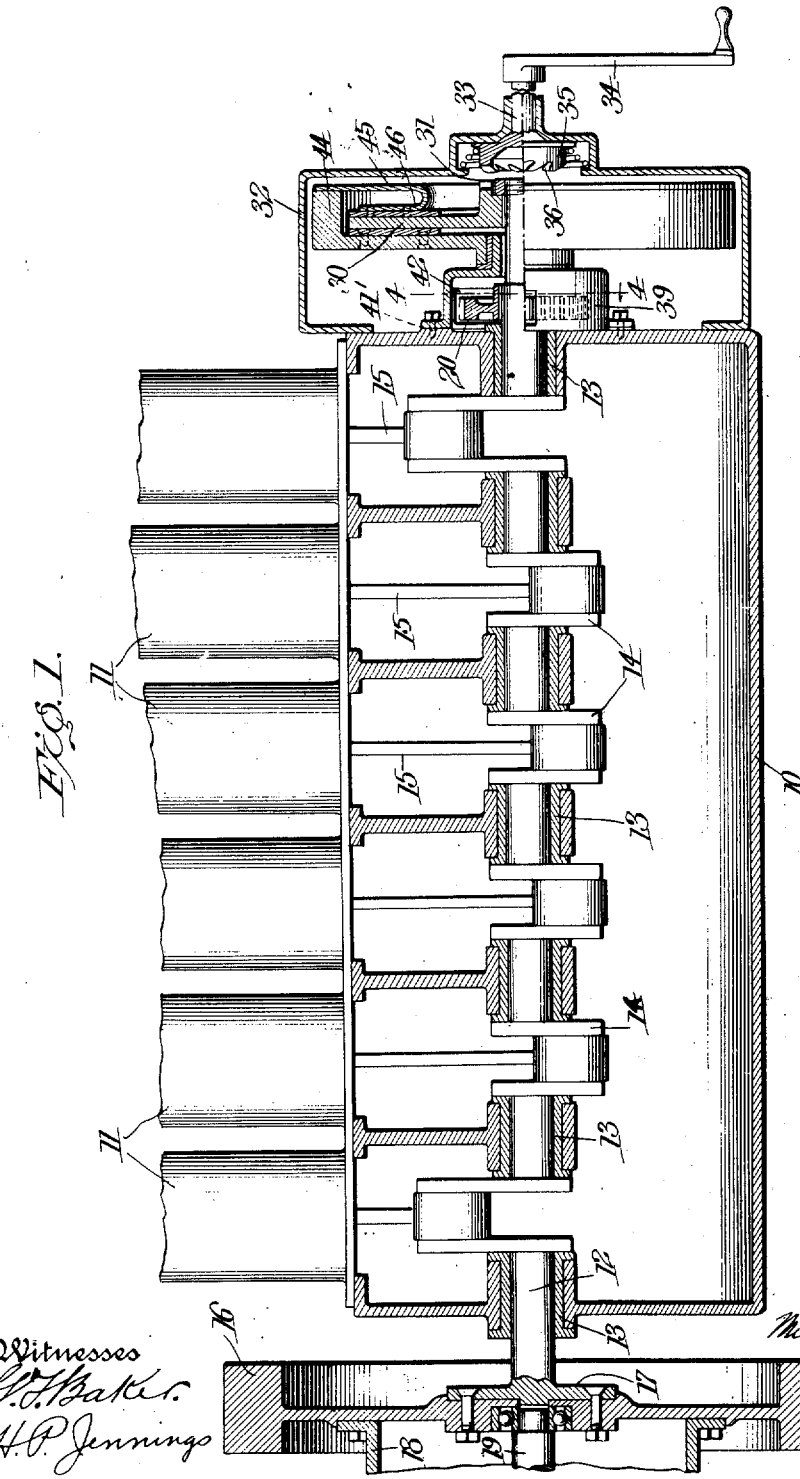

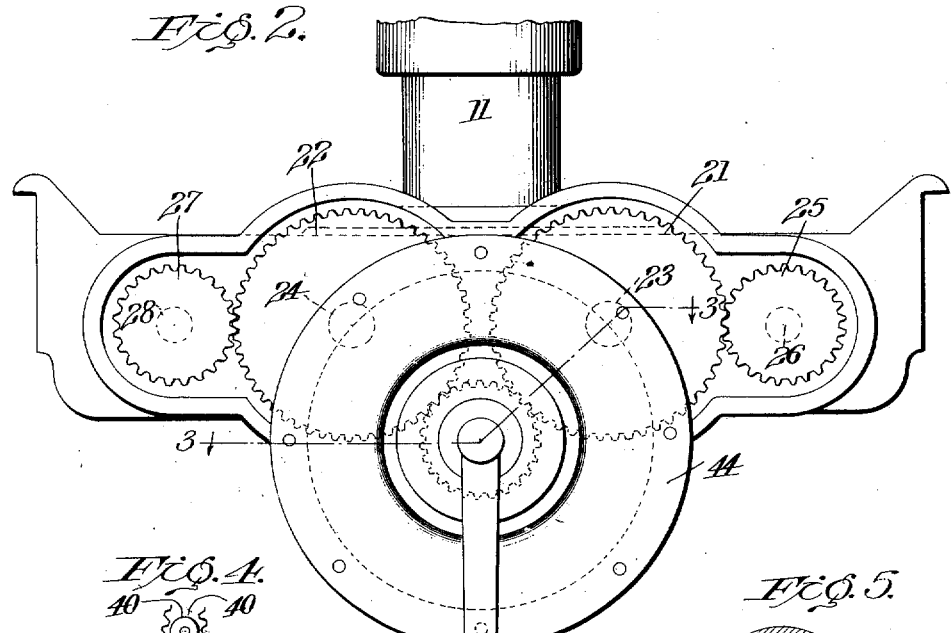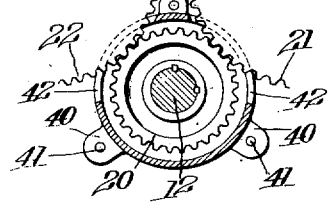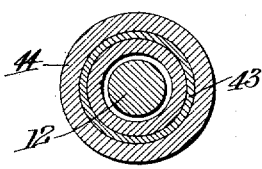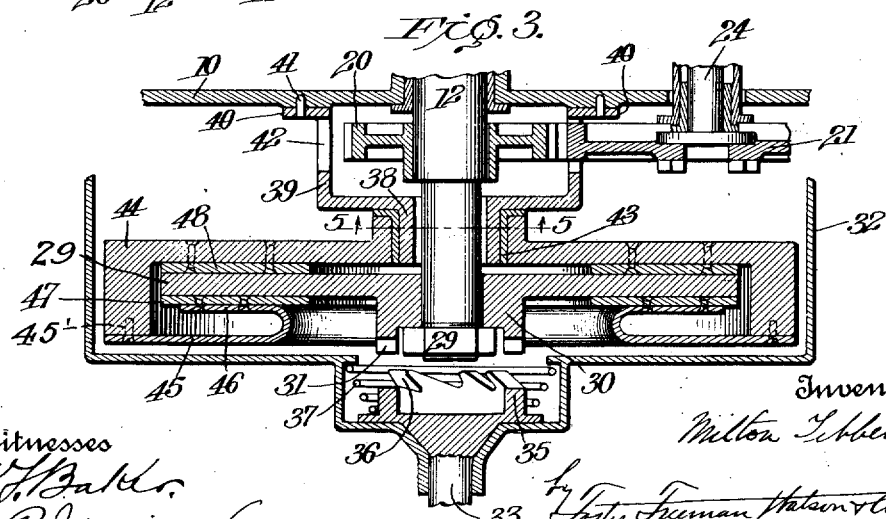

MILTON TIBBETTS, OF DETROIT, MICHIGAN, ASSIGNOR TO PACKARD MOTOR CAR COMPANY, OF DETROIT, MICHIGAN, A CORPORATION OF MICHIGAN.

HYDROCARBON-MOTOR.

1,257,052.      Specification of Letters Patent.      Patented Feb. 19, 1918.

Application filed May 21, 1915. Serial No. 29,659.

*To all whom it may concern:*

Be it known that I, MILTON TIBBETTS, a citizen of the United States, and resident of Detroit, county of Wayne, State of Michigan, have invented certain new and useful Improvements in Hydrocarbon-Motors, of which the following is a specification.

This invention relates to motors, and particularly to multi-cylinder hydrocarbon motors.

One of the objects of the invention is to provide a novel means for reducing or eliminating vibration in motors, and particularly synchronous vibration, or vibration such as is produced at certain speeds of a hydrocarbon motor when the time of the explosions in one or another cylinder coincides or synchronizes with the natural period of vibration of the crank shaft or of the crank case, or other motor part. For instance, in multicylinder hydrocarbon motors with a rigidly attached flywheel at one end, there is frequently set up a torsional vibration at the opposite end of the crank shaft which may become evident through transference to the cylinders and support of the motor by the attached reciprocating parts, that is, the connecting rods and pistons, or through the noise, or "slam" as it is sometimes called, caused by the backlash of the gears or drive chains for driving the cam and auxiliary shafts of the motor. In such motors the periods may vary in crank shafts of different sizes and material, sometimes occurring at seven or eight hundred revolutions per minute, then at fourteen or sixteen hundred, and again at around three thousand revolutions per minute, if the motor can be run at that speed. Such vibrations are materially reduced or entirely eliminated by the use of this invention.

The means herein shown, which is one form or illustration of the invention, comprises a frictional damper mounted at the end of the crank shaft remote from the main fly wheel end, and it is shown as having one of its parts, the heavier or fly wheel part, mounted on the crank case to thereby permit relative radial movement to the extent of the looseness of the several bearings, and to relieve the extended end of the crank shaft of the load of said fly wheel.

Other objects of the invention, and the various advantages of the novel features, will appear from the following detail description, taken in connection with the drawings, which form a part of this specification, and in which:—

Figure 1 is a vertical longitudinal sectional view of a motor embodying this invention;

Fig. 2 is a front view of the motor shown in Fig. 1;

Fig. 3 is a horizontal section on the line 3—3 of Fig. 2;

Fig. 4 is a transverse vertical section on the line 4—4 of Fig. 1; and

Fig. 5 is a section on the line 5—5 of Fig. 3.

Referring to the drawings 10 indicates the crank case of a motor and on this crank case a plurality of cylinders 11 are arranged. In Fig. 1 of the drawings I have shown six of the cylinders 11, but it will be understood that the invention is in no wise limited to a six-cylinder motor and may be applied to a motor having any preferred number of cylinders. A crank shaft 12 is supported in suitable bearings 13 in the crank case and is provided with cranks 14, there being a crank for each of the cylinders 11, and the connecting rods 15 are operatively connected with the cranks 14 whereby the usual pistons in the cylinders 11 are adapted to rotate the shaft 12. Any suitable number of bearings 13 may be provided.

In order to balance the variations in power applied to the crank shaft by the pistons it is customary to mount on one end of the crank shaft a flywheel such as is indicated at 16. In the particular embodiment of the invention shown the fly wheel 16 is bolted to a flange 17 on the crank shaft and carries a clutch casing indicated at 18. A clutch shaft is shown at 19 and it will be understood that any suitable form of clutch will be provided for operatively connecting the casing 18 with the shaft 19 in order to transmit the power of the motor to the shaft. The mechanism thus far described is commonly used and my improvements consist in mechanism applied to the opposite end of the crank shaft, from the flywheel 16, for the purpose of damping the vibrations above referred to, and also for the purpose of generally smoothing the action of the moving parts of the motor.

Mounted on the end of the crank shaft 12 and keyed thereto is a gear wheel 20 that meshes with the gears 21 and 22 which drive the cam shafts 23 and 24, respectively. Referring to Fig. 2 it will be seen that the gear 21 meshes with a gear 25 which drives an auxiliary shaft 26 and the gear 22 meshes with a gear 27 which drives an auxiliary shaft 28.

The crank shaft 12 projects beyond the gear 20 and has a member 30 keyed and secured thereto as by the nut 29. This member 30 has clutch teeth 31 on its outer face which coöperate with similar teeth 36 of the enlarged end 35 of a starting shaft 33, this shaft being provided with a crank 34 and being rotatably supported axially in line with the crank shaft in a suitable casing 32 removably secured to the front end of the crank case 10 over the gears 20, 21, 22, 25 and 27. The teeth 36 are normally held out of engagement with the teeth 31 by means of a suitable spring 37, but when it is desired to rotate the shaft 12 manually the shaft 33 is moved endwise to effect the engagement of the teeth 31 and 36. It will be observed that the teeth 31 and 36 are so arranged that they will automatically become disengaged when the engine starts and the shaft 12 rotates faster than the shaft 33.

One of the elements of the combination which I claim as affecting the principal object of the invention, viz., reducing or eliminating engine vibration, is an inertia member or flywheel 44 mounted at the end of the crank case opposite to that of the flywheel 16. In the embodiment of the invention shown, this flywheel 44 is connected to be driven by the crank shaft, or carried around with it, through the means of a coupling which permits a yieldingly restricted relative movement between the crank shaft and flywheel, preferably both rotatively and radially. In order that there may be relative radial movement, or movement throwing the shaft and wheel slightly out of exact axial alinement without at the same time unbalancing the individual rotating parts, the flywheel 44 is shown as rotatably mounted independently of the crank shaft bearings but substantially or exactly coaxial therewith. The small amount of play which naturally and necessarily exists in the bearings limits the relative radial movement here referred to. A bracket or bearing member 38 supports the flywheel 44 on the crank case beyond the gear 20, the flywheel turning on a bearing sleeve 43.

In the arrangement of the bearing member 38 it surrounds the projecting end of the crank shaft, preferably spaced therefrom as shown, and has a flange 39 by means of which it is secured to the crank case 10. The flange 39 is provided with lugs 40 to receive the dowels 41 and bolts 41' which position the bearing member and secure it to the crank case. The flange 39 is provided with openings 42 through which the gears 21 and 22 project in order to mesh with the gear 20.

The yielding connection between the two rotatable elements, that is the crank shaft 12 and the flywheel 44, in the embodiment shown, comprises coöperating friction pieces, 29, 47 and 48, the piece 29 being arranged between the pieces 47 and 48 and being formed as a rotatably rigid part of the crank shaft and shown as an integral flange or plate on the member 30, and the pieces 47 and 48 being formed as rotatably rigid parts of the flywheel 44. The piece 47 is shown as riveted to the part 46 of an annular disk 45 which is preferably made of resilient or spring material, and the piece 48 is riveted to the web of the flywheel 44. The disk 45 is secured to the rim of the flywheel, as by screws 45' and by its resiliency maintains a yielding frictional engagement of the pieces and compensates for any wear that may occur between the rubbing surfaces.

It will be understood that in the normal operation of the motor there is substantially no relative movement between the crank shaft 12 and the flywheel 44, the latter being carried around on its bearing sleeve 43 with practically no resistance. But if, for any reason, a vibration is set up in the motor, it tends to reach the flywheel 44 through its frictional connection with the crank shaft, and it is there resisted and damped out and the synchronism destroyed, with the result that the vibrations, instead of increasing, are arrested in their inception and the motor caused to run smoothly and quietly.

Having thus described my invention what I claim is:—

1. In a hydrocarbon motor, the combination with a crank case and a crank shaft having a plurality of cranks and mounted in bearings in said crank case, a flywheel rigidly connected with one end of said crank shaft, and a flywheel mounted independently of the crank shaft bearings and connected to the other end of the crank shaft.

2. In a hydrocarbon motor, the combination with a crank case and a crank shaft having a plurality of cranks and mounted in bearings in said crank case, a flywheel mounted upon and rigidly connected to one end of the crank shaft, and a flywheel mounted on the crank case and connected with the other end of the crank shaft.

3. In a hydrocarbon motor, the combination with a crank case and a crank shaft having a plurality of cranks and mounted in bearings in said crank case, a flywheel rigidly connected with one end of said crank shaft, a flywheel mounted independently of the crank shaft bearings, and a friction plate connection between the flywheel and the other end of the crank shaft.

4. In a multi-cylinder hydrocarbon motor, the combination with the crank case and the crank shaft mounted in bearings therein, of a flywheel having a bearing on the crank case, and a driving connection between the crank shaft and the flywheel.

5. In a multi-cylinder hydrocarbon motor, the combination with the crank case and the crank shaft mounted in bearings therein, of a flywheel having a bearing on the crank case, and a yielding driving connection between the crank shaft and the flywheel.

6. In a multi-cylinder hydrocarbon motor, the combination with the crank case and the crank shaft mounted in bearings therein, of a flywheel having a bearing on the crank case, and a yielding frictional driving connection between the crank shaft and the flywheel.

7. In a multi-cylinder hydrocarbon motor, the combination with the crank case and the crank shaft mounted in bearings therein, of a flywheel having a bearing on the crank case, substantially coaxial with the crank shaft, and a radial disk driving connection between the crank shaft and flywheel adapted to permit yieldingly restricted relative movement between the crank shaft and flywheel both rotatively and radially.

8. In a hydrocarbon motor, the combination with a crank case, a crank shaft mounted in bearings therein, and a gear on the crank shaft adjacent one of said bearings, of a flywheel, and a friction driving connection between the crank shaft and the flywheel beyond said gear.

9. In a hydrocarbon motor, the combination with a crank case, a crank shaft mounted in bearings therein, a gear on the crank shaft adjacent one of said bearings, of a flywheel rotatably supported on the crank case, and a connection between the crank shaft and the flywheel beyond said gear.

10. In a hydrocarbon motor, the combination with a crank case, a crank shaft mounted in bearings therein, and a flywheel rotatably supported on the crank case on a bearing spaced axially from one of the crank shaft bearings, and a driving connection between the crank shaft and the flywheel, of a gear on the crank shaft arranged between said spaced bearings.

11. In a hydrocarbon motor, the combination with a crank case, a rotatable crank shaft mounted therein and a flywheel rotatably mounted on the crank case, of driving means connecting said rotatable elements and comprising a friction piece rotatably rigid on one of said rotatable elements, and two friction pieces coöperating with the first said friction piece and rotatably rigid on the other of said rotatable elements, one of said friction pieces being carried by a resilient member causing yielding engagement of the first said piece with the other two.

12. In a hydrocarbon motor, the combination with two rotatable elements comprising a crank shaft and a flywheel, of connecting means for said elements comprising a friction piece formed as a rotatably rigid part of one of said elements, and two friction pieces coöperating with the first said friction piece and formed as rotatably rigid parts of the other of said elements, one of said two friction pieces being mounted on a resilient member which causes yielding engagement of the pieces.

13. In a hydrocarbon motor, the combination with two rotatable elements comprising a crank shaft and a flywheel, of connecting means for said elements comprising a friction piece formed as a rotatably rigid part of one of said elements, and two friction pieces coöperating with the first said friction piece and formed as rotatably rigid parts of the other of said elements, one of said friction pieces being formed to cause yielding engagement of the first said friction piece with the other two said pieces.

14. In a hydrocarbon motor, the combination with the crank case and the crank shaft mounted in bearings therein, of a flywheel rotatably mounted on the crank case substantially coaxial with the crank shaft, and means connecting the crank shaft and flywheel and permitting yieldingly restricted relative movement.

15. In a hydrocarbon motor, the combination with the crank case and the crank shaft mounted in bearings therein, of a flywheel rotatably mounted independently of the crank shaft bearings and substantially coaxial therewith, and means connecting the crank shaft and flywheel and permitting yieldingly restricted relative movement.

16. In a hydrocarbon motor, the combination with the crank case and the crank shaft mounted in bearings therein, of a flywheel rotatably mounted on the crank case independently of the crank shaft bearings and substantially coaxial therewith, and means connecting the crank shaft and flywheel and permitting yieldingly restricted relative movement both rotatively and radially.

17. In a motor vehicle, the combination with a crank case having bearings, and a crank shaft mounted in said bearings and extending beyond one of the end bearings, of a gear on the extended end of the crank shaft, a bracket on the crank case extending around said gear and carrying a bearing, a flywheel mounted on said latter bearing, and means connecting said flywheel with the end of said crank shaft beyond said gear.

18. In a motor vehicle, the combination with a crank case having bearings, and a crank shaft mounted in said bearings and extending beyond one of the end bearings, of a gear on the extended end of the crank shaft, a bracket on the crank case extending around said gear and carrying a bearing, a flywheel mounted on said latter bearing, means connecting said flywheel with the end of said crank shaft beyond said gear, and a starting crank adapted to connect with said crank shaft beyond said flywheel.

19. In a motor vehicle, the combination with a crank case having bearings, and a crank shaft mounted in said bearings and extending beyond one of the end bearings, of a gear on the extended end of the crank shaft, a bracket on the crank case extending around said gear and carrying a bearing, a flywheel mounted on said latter bearing, means connecting said flywheel with the end of said crank shaft beyond said gear, a cover over said parts beyond said end bearing, and a starting crank mounted in said cover and having a part adapted to be non-rotatively connected to the crank shaft.

20. In a hydrocarbon motor, the combination with the crank case having bearings, a crank shaft mounted in some of said bearings, and a valve operating shaft mounted in others of said bearings, of a gear on the crank shaft beyond one of the end bearings, driving connections from said gear to the valve operating shaft, a bracket on the crank case extending around said gear and driving connections, and having a bearing beyond said gear, a flywheel mounted on said latter bearing, and a friction driving connection between said flywheel and the crank shaft beyond said gear.

In testimony whereof I affix my signature.

MILTON TIBBETTS.

Witnesses:
CLAIR J. COTE,
A. K. SPEER.